A. M. McLERAN.
CALF-WEANER.
No. 176,027. Patented April 11, 1876.
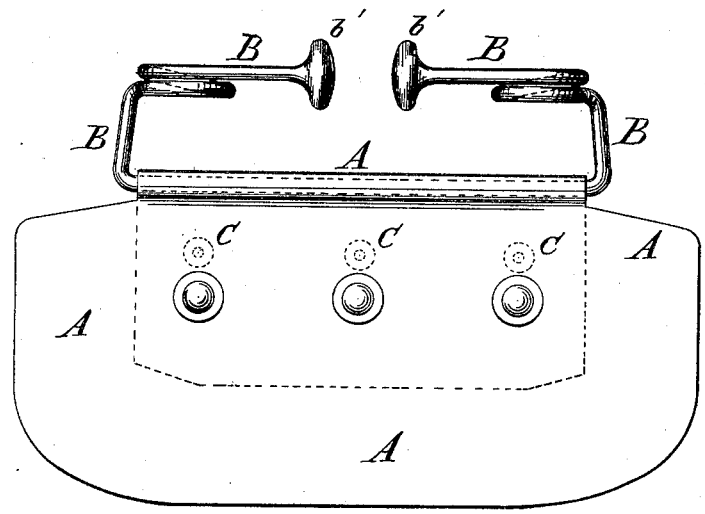
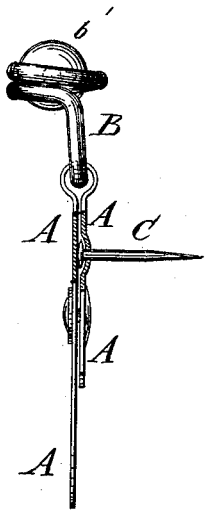
WITNESSES:
Chas. Nida
Alex F. Roberts
INVENTOR:
A. M. McLeran
BY
Munn
ATTORNEYS.

UNITED STATES PATENT OFFICE.

ALVORD M. McLERAN, OF ONAWA CITY, IOWA.

IMPROVEMENT IN CALF-WEANERS.

Specification forming part of Letters Patent No. 176,027, dated April 11, 1876; application filed November 13, 1875.

*To all whom it may concern:*

Be it known that I, ALVORD M. MCLERAN, of Onawa City, in the county of Monona and State of Iowa, have invented a new and useful Improvement in Calf-Weaners, of which the following is a specification:

Figure 1 is a rear view of the device. Fig. 2 is a side view of the same, partly in section, to show the construction.

Similar letters of reference indicate corresponding parts.

The object of this invention is to furnish an improved device for weaning calves, and preventing other stock from sucking either themselves or others, and which shall be simple in construction, conveniently applied, and shall not prevent the animals to which it may be applied from eating freely.

The invention consists in the combination of the folded plate, the bent and knobbed wire, and the spikes with each other, as hereinafter fully described.

A is a plate of sheet metal, the upper part of which is made narrower than the main part, and is bent over upon said main part, inclosing a wire, B, in the bend, and is secured in place by rivets. The end parts of the wire B are bent outward, and then inward, are bent into coils to give them elasticity, and their ends are extended inward until they nearly meet, and have knots $b'$ formed upon them. C are sharp nails or spikes, which are inserted in holes in one part of the plate A, with their heads between the two parts of said plate, as shown in Fig. 2.

In using the device, the knobbed ends of the wire B are sprung into the nostrils of the animal, so as to rest against the cartilage of the nose, where they are secured in place by the elasticity of the said wire B.

With this construction the plate A prevents the animal to which the device may be applied from getting hold of the teats with its mouth, and should it attempt to suck, the spikes C will be thrust into the cow and prevent her from standing still. The spikes C also prevent the animal from throwing the plate A upward upon its nose, and thus getting it out of the way. At the same time the device does not prevent the animal from putting its mouth to the ground and eating freely.

Having thus described my invention, I claim as new and desire to secure by Letters Patent—

The combination of the folded plate A, hinged to the bent and knobbed wire B $b'$, and the spikes C with each other, substantially as herein shown and described.

ALVORD M. McLERAN.

Witnesses:
G. W. McMILLAN,
A. P. McLERAN.